(12) United States Patent
Snow

(10) Patent No.: US 6,354,167 B1
(45) Date of Patent: Mar. 12, 2002

(54) SCARA TYPE ROBOT WITH COUNTERBALANCED ARMS

(75) Inventor: Jeffrey M. Snow, Bloomington, IN (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 25 days.

(21) Appl. No.: 09/603,600

(22) Filed: Jun. 26, 2000

(51) Int. Cl.7 ................................................ B25J 18/00
(52) U.S. Cl. ............................. 74/490.01; 74/490.03; 74/490.04; 248/648; 248/664; 414/744.5; 414/917; 901/19; 901/21; 901/48
(58) Field of Search ...................... 74/490.01, 490.03, 74/490.04; 248/648, 664; 414/744.5, 917; 901/19, 21, 48

(56) References Cited

U.S. PATENT DOCUMENTS

| | | | |
|---|---|---|---|
| 3,952,984 A | * 4/1976 | Dimitry | 248/282.1 |
| 4,229,136 A | 10/1980 | Panissidi | 414/673 |
| 4,392,776 A | 7/1983 | Shum | 414/744 R |
| 4,775,289 A | 10/1988 | Kazerooni | 414/735 |
| 4,897,015 A | * 1/1990 | Abbe et al. | 414/744.8 |
| 4,954,043 A | 9/1990 | Yoshida et al. | 414/719 |
| 5,456,130 A | 10/1995 | Pierson et al. | 74/469 |
| 5,634,377 A | 6/1997 | Kimura et al. | 74/469.04 |
| 5,746,565 A | * 5/1998 | Tepolt | 414/744.5 |
| 5,811,951 A | * 9/1998 | Young | 318/568 |
| 6,085,670 A | * 7/2000 | Genov | 108/147 |

OTHER PUBLICATIONS

Goetsch, Nelson and Clark "Technical Drawing" Published by Delmar Publishers Inc 1994, p. 24.

* cited by examiner

Primary Examiner—Allan D. Herrmann
(74) Attorney, Agent, or Firm—Mark Homer

(57) ABSTRACT

A SCARA type robot with counterbalanced arms and tilting base. This apparatus enables accurate planar movement of a probe. Weak or flexible foundations or footings do not affect positioning accuracy of the probe. Positioning accuracy, relative to the movement plane, of a probe is unaffected by positions of the arms. At any angle of the probe movement plane the counterbalanced arms allow the same size drive motors, torque transmission devices, and drive electronics. These features make the invention very useful for on-site or portable near-field testing of antennas. A manipulator may be used in place of the probe. Most of the benefits will be retained if load variations on the manipulator are kept small.

12 Claims, 4 Drawing Sheets

SCARA TYPE ROBOT WITH COUNTERBALANCED ARMS

CROSS-REFERENCED TO RELATED APPLICATIONS

Not Applicable

BACKGROUND—FIELD OF INVENTION

The invention is a SCARA type robot with counterbalanced arms and tilting base, these features make the invention especially useful for on-site or portable near-field testing of antennas.

BACKGROUND—DESCRIPTION OF PRIOR ART

A SCARA (Selective Compliance Assembly Robot Arm) robot is a robotic arm structure of two jointed links or arms rotating about parallel vertical axes. One end of the base arm mounts on a shaft or bearing on a base. The base arm is rotated about this shaft or bearing. The other end of the base arm supports an end of the second arm on a shaft or bearing. The second arm is rotated about this shaft or bearing. The axes of both shafts or bearings are parallel and vertical. An end effector, such as a probe, camera, manipulator, etc, is placed at the other end of the second arm. Appropriate rotations of the arms will position the end effector at any given point in a plane. An embodiment of a SCARA is in U.S. Pat. No. 4,392,776 to Shum (1983). This patent has no counterbalancing of either arm.

There are multiple US patents having means to counterbalance robot arms. Most of these patents do not directly apply to SCARA type robots and use springs, pneumatics, or counterweights with multiple links. Some examples are: U.S. Pat. No. 4,954,043 to Yoshida (1990), U.S. Pat. No. 4,229,136 to Panissidi (1980), and U.S. Pat. No. 5,456,130 to Pierson et al. (1995). These arrangements add expense, and complication to the robot arm.

U.S. Pat. No. 5,634,377 Kimura et al. (1997) has a SCARA type robot arm with a counterbalanced second arm. Kimura's invention has many other features. These features and the counterbalance all relate to improving the dynamic performance and control of the arm. A counterweight or a drive motor for an end effector at the second arm tip provides balancing. There is no counterbalance on the base arm. Movement of the base arm will change the forces on the base and base supporting surface therefore accuracy of the second arm tip location will be effected. If the robot arm assembly is tilted such that the base arm moves in a non-horizontal plane the loads on the base arm drive mechanism will increase.

U.S. Pat. No. 4,775,289 Kazerooni (1988) has a robot arm with a counterbalance arm assembly. The arm assembly is counterbalance about the vertical rotation axis of the base. Therefore arm movements do not change loads into the base. Kazerooni's invention is very similar to a SCARA arm arrangement with the addition of rotation about a horizontal axis and using a link to rotate the second arm. The second arm is not counterbalanced by itself therefore second arm movement will cause different loads into the base arm affecting accuracy of the second arm tip location. The link used to rotate the second arm limits the second arm rotation. Accurate control of the second arm becomes progressively worse as the angle between the second arm and base arm is further away from 90 degrees. The use of the second arm drive motor as a counterweight limits the location of the drive motor.

The linkage used in an arm-type drafting machine can be used to control the angular orientation of a SCARA end effector relative to the SCARA's base. Prior to the extensive use of computer aided drafting an arm-type drafting machine was very common in drafting and engineering offices. The base of the arm-type drafting machined is secured to the drafting table. The drafting head is linked via two arms, (similar to a SCARA arrangement), and pulleys and belts to the base. The drafting head keeps its same angular orientation to the base regardless of the drafting head movement. Drafting machines have no provisions to change the angular orientation of the drafting head from operation of a device at the base.

SUMMARY

The invention is a SCARA type robot with counterbalanced arms and tilting base. This apparatus enables a probe to move or be positioned over an arbitrarily orientated plane. Weak or flexible foundations or footings do not affect positioning accuracy of a probe. These features make the invention very useful for on-site or portable near-field testing of antennas.

Object and Advantages

This device has significant advantages over other methods for accurate planar movement of a probe. A probe, in this case, is any end effector that only has insignificant total weight changes or force changes during any movement cycle. For example, a camera or antenna would be a probe. An end effector that picked up or placed items would be a manipulator. These advantages also apply to manipulator in place of the probe if the manipulator load is relatively small. This device is very suitable to rapid set-up and use on poorly prepared sites. Only a small pedestal base or foundation is required. Alignment is not required between separate foundations or within a large foundation. Movement of the probe does not change loads on the base and supporting structure or surface. Therefore a weak or flexible base and support does not affect the accuracy of the probe location.

Usability in poor environmental conditions is enhanced by only using rotary joints. There are no linear sliding joints, mating surfaces, or rails. It is much easier to excluded contamination from rotary joints than linear joints. Balanced arms allow the use of smaller motors, gear trains, and drive electronics.

A hinge at the base allows tilting of the probe movement plane. This allows easier and better testing of antennas (or other objects) in various orientations. The antenna does not have to be removed from its pedestal and tested in an abnormal position. The same antenna can be tested in several orientations to check for the effect of reflections from the test environment.

DRAWING FIGURES

REFERENCE NUMERALS IN DRAWINGS

Figure 1:
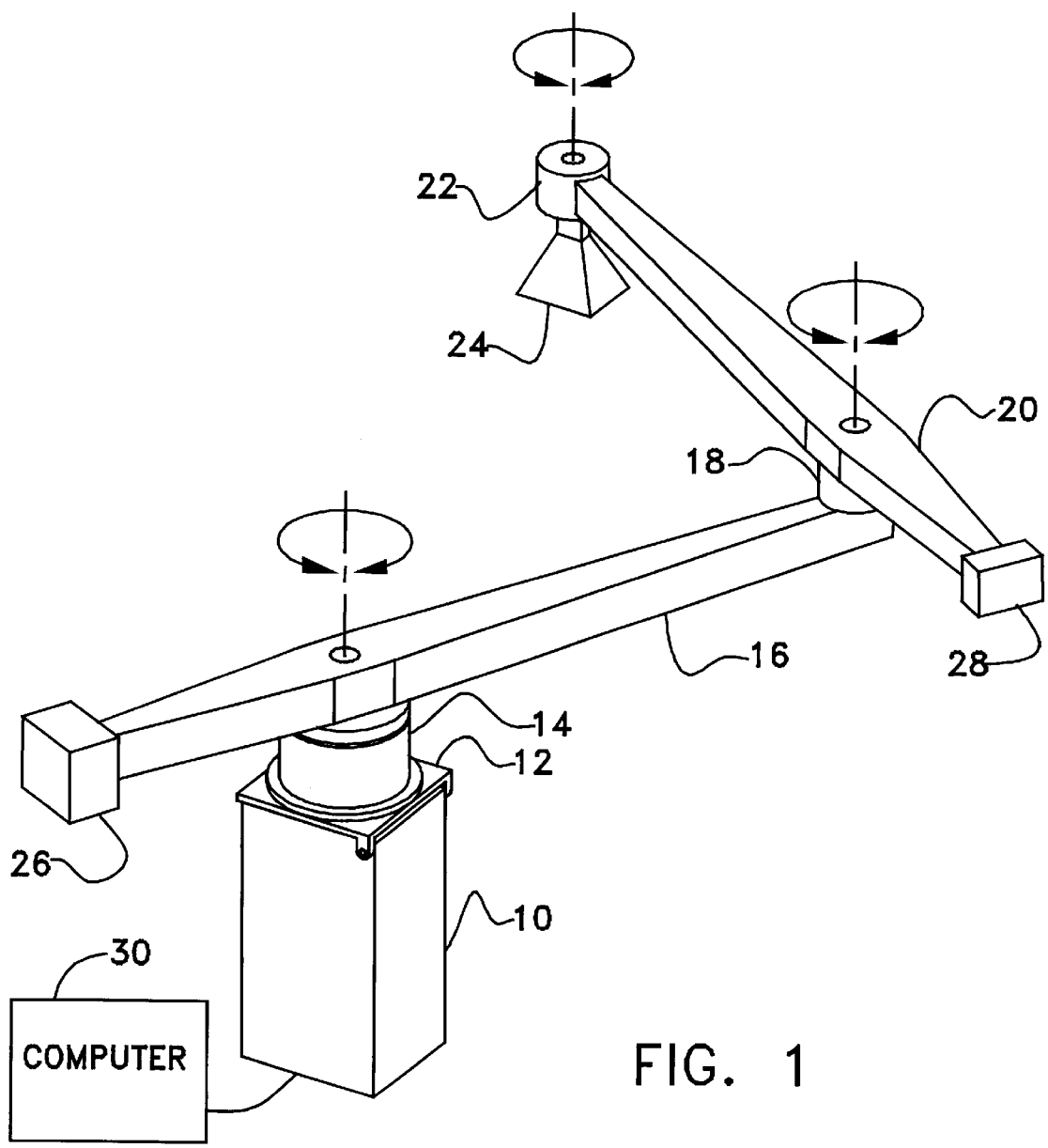
FIG. 1 is an overall isometric view of the apparatus.

10 base
12 tilting mechanism
13 mounting surface 14 base rotary positioner
15 non-rotating portion of base rotary positioner
16 base arm
18 second rotary positioner
20 second arm
22 tip positioner
24 probe
26 base arm counterweight
28 second arm counterweight
30 computer
32 rotator
34 base pulley and shaft
35 base pulley
36 base belt
38 intermediate pulley set and shaft
40 second belt
42 tip pulley shaft
43 tip pulley
44 first pulley
46 second pulley
48 positioner base
50 main bearing assembly
52 main bearing inner race with integral bull gear
54 main bearing outer race
56 ball
58 turntable
60 encoder
62 encoder pinion gear
64 gear-motor
66 gear-motor pinion gear
68 controller

Figure 2:
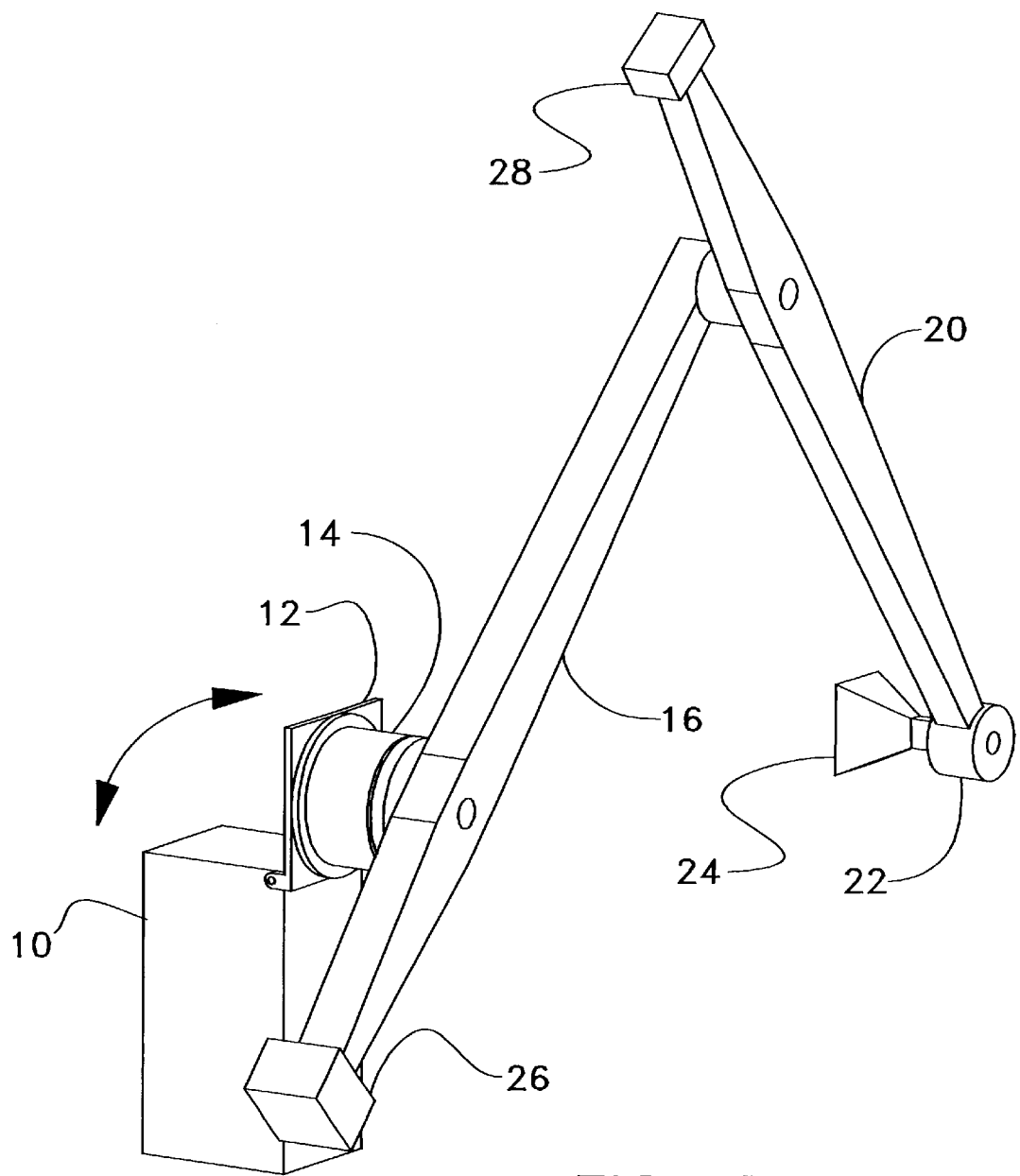
FIG. 2 shows the apparatus tilted so that the probe moves in an inclined plane.

DESCRIPTION—FIGS. 1 and 2—Preferred Embodiment

FIG. 1 shows the overall view of the invention. FIG. 2 shows the invention is a tilted position. A base 10 supports a tilting mechanism 12. A base rotary positioner 14 is mounted to tilting mechanism 12. Rotary positioners are common industrial apparatus that are used to rotate other apparatus to a specific angular position or at a specific angular speed in response to computer signals. A base arm 16 attaches to base positioner 14 and extends in two opposite directions. A second rotary positioner 18 attaches to one tip of base arm 14. A base arm counterweight 26 attaches to the other tip of base arm 18. The rotation axis of second rotary positioner 18 is parallel to the rotation axis of base rotary positioner 14. A second arm 20 attaches to second rotary positioner 18 and extends in two opposite directions. A tip rotary positioner 22 attaches to one tip of second arm 20. A second arm counterweight 28 attaches to the other tip of second arm 20. The rotary axis of tip rotary positioner 22 is parallel to rotary axes of positioners 14 and 18. A probe 24 attaches to tip rotary positioner 22. A computer 30 connects to all positioners 14, 18, and 22.

Second arm counterweight 28 has the weight required to balance second arm 20 and all its attachments about the rotation axis of second rotary positioner 18. Base arm counterweight 26 has the weight required to balance base arm 16 and all its attachments about the rotation axis of base rotary positioner 14.

Operation

Tilting mechanism 12 is adjusted to provide the desired inclination of the plane of probe 24 movement. Probe 24 is moved or positioned over any arbitrary path (in the probe movement plane) via simultaneous and coordinated rotation of base arm 16 and second arm 20. The arms are rotated by operation of rotary positioners 14 and 18 via commands from computer 30. The operation, discussed so far, is identical to a SCARA robot with the addition of a tilting base.

Counterweights 26 and 28 on each arm provide significant benefits compared to a conventional SCARA robot. The counterweights allow the tilting of the plane of probe movement without increasing the torque loads on the positioners. In a conventional SCARA robot gravity would cause increased torque loads with increasing tilt angle. Torque load would be greatest when the tilt is completely vertical (as shown in FIG. 2). Second arm counterweight 28 prevents varying torsion loads on base arm 16 as second arm 20 rotates. Therefore the deflection of the end effector in a direction normal to the probe movement plane does not change as second arm 20 rotates.

Base arm counterweight 28 prevents varying loads into the base. Therefore rotation of base arm 16 does not cause varying deflections of probe 24 due to flexibility of the base 10 or support surfaces. The benefits of constant deflection become greater with increasing arm length.

There are two possible arrangements of arms for the same probe position. This two arm arrangement option can be used to check for the effect of radio frequency reflections off the arms (in the case of near-field antenna testing), to get around an obstacle, or to allow better visual access.

Description and Operation of Alternative Embodiments

The drive motor of a rotary positioner is offset from the positioner such that the motor acts as a counterweight. The drive motor is connected to the positioner via a drive belt, shaft, or other method to effect rotation of the positioner.

Probe 24 is replaced with a manipulator to pick, place, or move objects. The benefits are nearly the same if the manipulator is lightly loaded. Greater load variations have a greater effect on accuracy due to greater imbalance of the arms.

Figure 3:
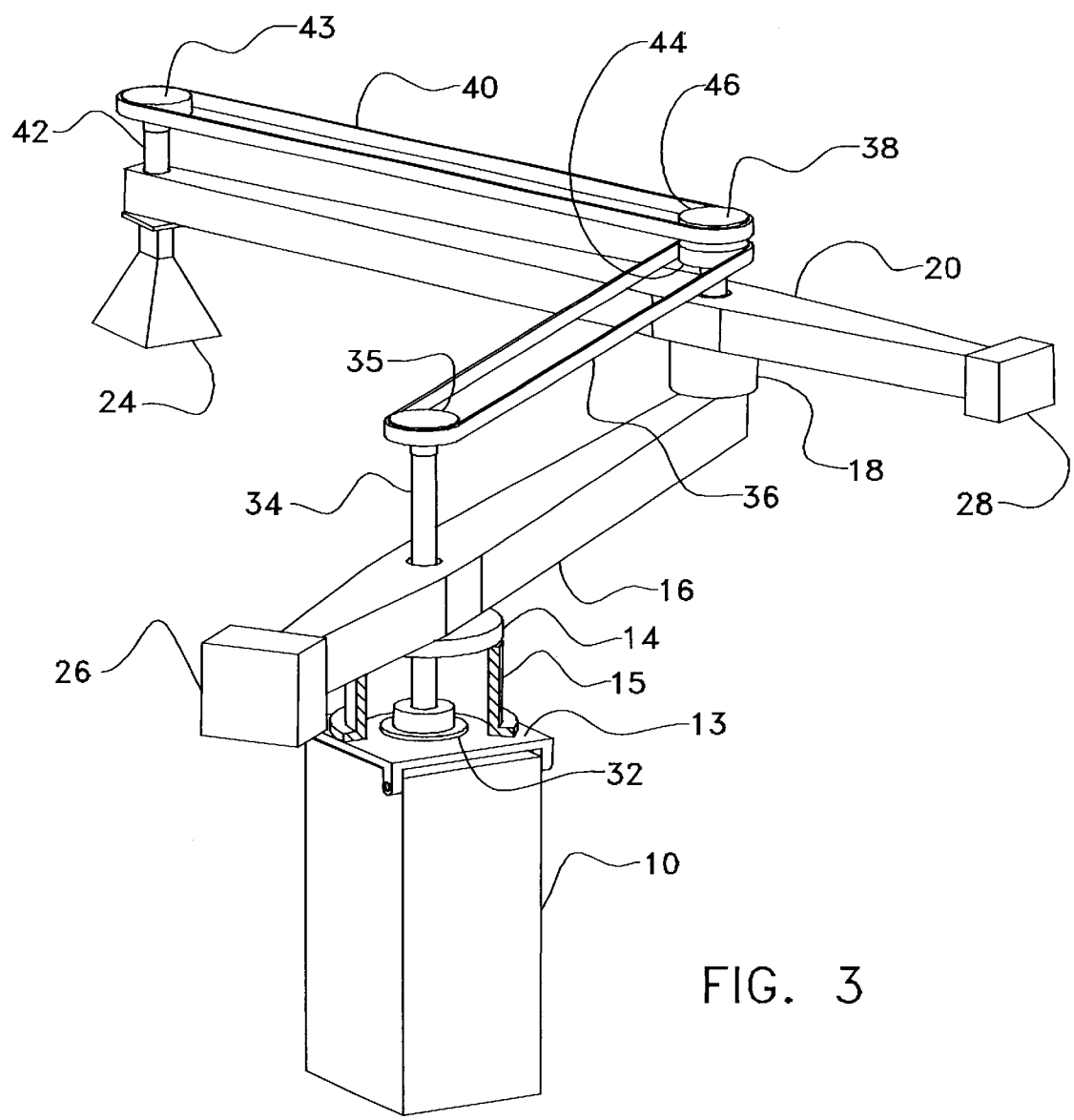
FIG. 3 is an isometric view with an alternative arrangement to control probe angular orientation.

FIG. 3 shows an alternative method to control the orientation of probe 24. A linkage is provided similar to an arm-type drafting machine. A base pulley 35 and shaft 34 is a rigidly connected assembly and is held collinear with rotation axis of base positioner 14. Base pulley 35 and shaft 34 are free to rotate relative to base arm 16 and base positioner 14. The shaft portion extends thru base arm 16 and base positioner 14 and connects to a rotator 32. Positioner 14 is rotatably connected to non-rotating portion of base rotary positioner 15. Rotator 32 is a device to rotate base pulley 35 and shaft 34. Any method may be used to operate rotator 32 such as: manual operation, power operated without feedback, power operated with feedback, etc. Rotator 32 may be eliminated and the shaft end directly connected to the non-rotating portion of base positioner 14 or the base positioner's mounting surface 13. The elimination of rotator 32 fixes the angular orientation of probe 24 to base 10. An intermediate pulley set (first pulley 44 and second pulley 46) and shaft 38 is a rigidly connected assembly of two pulleys 44, 46 and a shaft 38. Intermediate pulley set 44, 46 and shaft 38 is held collinear with rotation axis of second positioner 18. Intermediate pulley set 44, 46 and shaft 38 is free to rotate. Tip pulley 43 and shaft 42 is held collinear with rotation axis of end effector 24. The shaft portion is connected to and rotates end effector 24. A belt 36 is placed over the pulley of base pulley 35 and shaft 34 and over one of the two pulleys 44, 46 of intermediate pulley set and shaft 38 and over the pulley of tip pulley 43 and shaft 42. Belts and pulleys are provided with means to prevent slippage between them such as: cogged belts and toothed pulleys, perforated belts and pulleys with radial pins, belts under tension for adequate friction force with pulleys, etc. All the pulleys are the same pitch diameter.

Similar to an arm-type drafting machine rotation of the base arm 16 or second arm 20 does not change the angular orientation of the probe 24 to the base 10. During rotation of an arm the belt cause the pulley at the arm end to rotate an equal amount, thus the angular orientation between the pulleys does not change. Therefore, the angular orientation of probe 24 does not change relative to base pulley 35 and shaft 34. Rotation of base pulley 35 and shaft 34 by rotator 32 rotates probe 24 by an equal amount. This arrangement reduces weight on the arms and eliminates a requirement to actively control a tip positioner.

Figure 4:
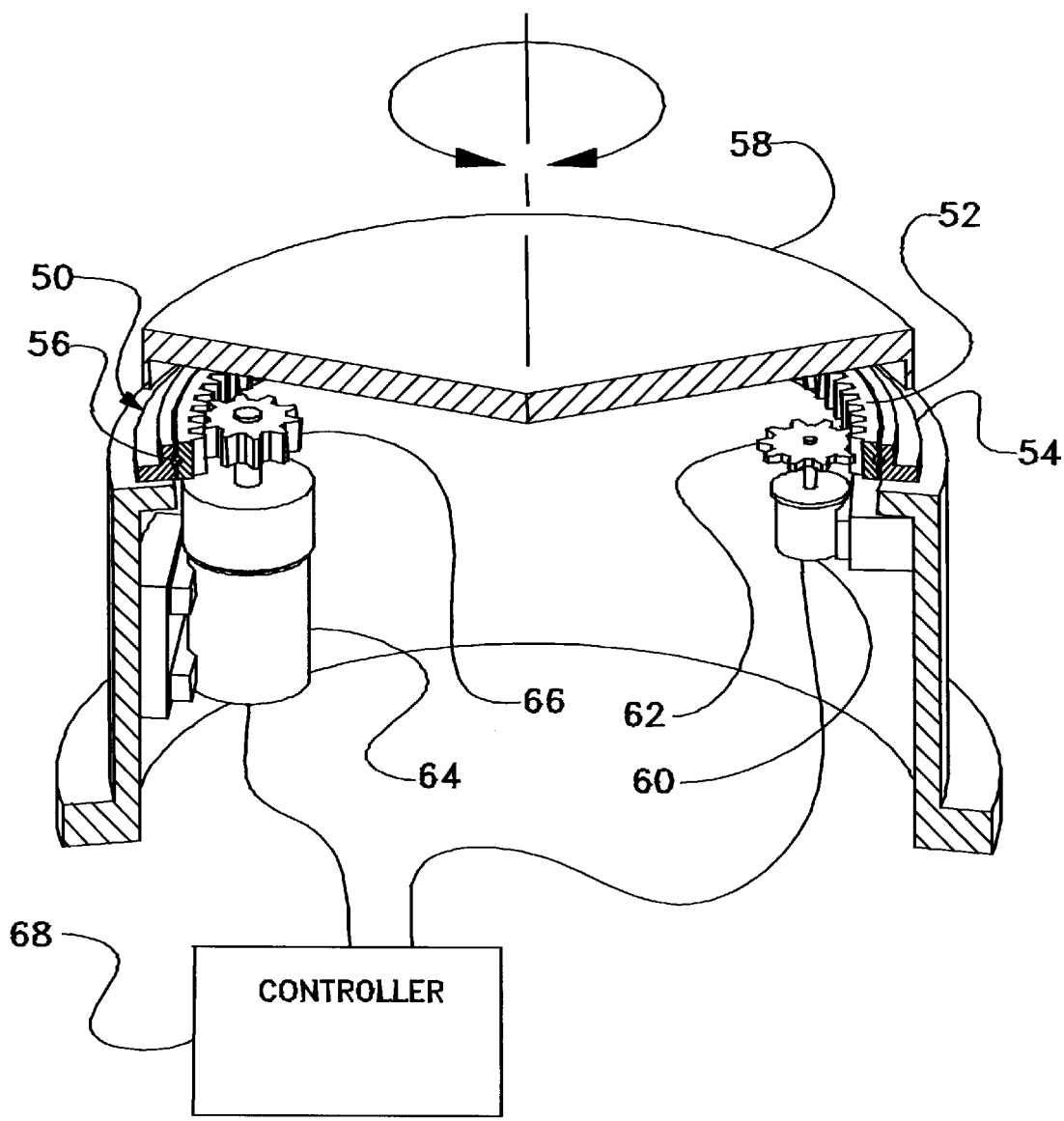
FIG. 4 is a cutaway of a prior art rotary positioner.

FIG. 4 shows a prior art rotary positioner. There are multiple other possible configurations. The configuration shown here has a positioner base 48 supporting a gear motor 64, an encoder 60, and a main bearing assembly 50. The main bearing consists of a main bearing inner race with integral bull gear 52, a main bearing outer race 54, and balls 56. The balls 56 arm the rolling anti-friction elements between the inner and outer races 52, 54. The main bearing outer race 54 is attached to the positioner base 48. The turntable 58 is attached to the main bearing inner race 52. The controller 68 sends electrical power to turn the gear-motor 64. A gear motor is a motor with an integral speed reduction gearbox. The gear-motor 64 turns the gear-motor pinion gear 66 which is engaged with and turns the bull gear of the main bearing inner race 52. The encoder pinion gear 62 is engaged with and is turned by the bull gear. This provides position indication or feed back to the controller 68.

Some other common variations of the above described rotary positioner in the prior art follow. One is to have a separate gear box from the motor. The encoder may be driven by another gear rather than the bull bear. The encoder may be coupled directly to the turntable. The encoder may be coupled to the motor or gear box. The main bearing may have an integral bull gear on the inner race then the inner race is attached to the base and the outer race is attached to the turntable. The bull bear may be separate from the main bearing.

Conclusion, Ramifications, and Scope of Invention

The reader will see that the modified SCARA type robot of the invention is very useful for accurate planar movement of a probe or lightly loaded manipulator. This device is very suitable to rapid set-up and use on poorly prepared sites. Counterbalancing of the arms allows use of smaller and cheaper motors, gear trains, and drive electronics. The feature of accurate probe movement is well suited to near-field testing of antennas. While the above description contains many specificities, these should not be construed as limitations on the scope of the invention, but rather as an exemplification of one preferred embodiment thereof. Many other variations are possible. For example a probe with circular symmetry can be used which does not require rotation therefore the tip positioner is not required. Another variation is to locate the pulleys and belts inside the arms. Another possible variation is having different pulleys diameters if the diameter ratios are properly designed. Accordingly, the scope of the invention should be determined not by the embodiment(s) illustrated, but by the appended claims and their legal equivalents.

I claim:

1. A robot for accurate planar movement of an end effector comprising:

a base rotary positioner;

said base rotary positioner supports and rotates a base arm;

a second rotary positioner mounted on the distal end of said base arm, said second rotary positioner is oriented such that its axis of rotation is parallel to axis of rotation of said base rotary positioner;

said second rotary positioner supports and rotates a second arm relative to said base arm;

said second arm supports an end effector on distal end of said second arm;

said second arm supports a counterweight such that said second arm and all its attachments are substantially balanced about rotation axis of said second rotary positioner;

said base arm supports a counterweight such that said base arm and all its attachments are substantially balanced about rotation axis of said base rotary positioner; and, a tilt mechanism beneath the base rotary positioner wherein the tilt mechanism may tilt the robot from a horizontal plane to a vertical plane.

2. The robot of claim 1 further including a base supporting said base rotary positioner.

3. The robot of claim 2 further including a tilt mechanism is provided between said base and said base rotary positioner.

4. The robot of claim 1 further including a tip rotary positioner located on distal end of said second arm, said tip rotary positioner rotates said end effector.

5. The robot of claim 1 further including:

a base pulley and shaft located concentric with rotation axis of said base rotary positioner, shaft of said base pulley and shaft extends through said base rotary positioner and is rigidly rotationally connected to non-rotating portion of said base rotary positioner or the mounting surface for said base rotary positioner;

an intermediate pulley set and shaft has a first pulley and a second pulley, said intermediate pulley set and shaft is located concentric with rotation axis of said second rotary positioner, said intermediate pulley set and shaft is free to rotate;

a base belt placed over pulley of said base pulley and shaft and over said first pulley of said intermediate pulley set and shaft, said first belt and said pulleys have means to prevent slippage between themselves;

a tip pulley and shaft located concentric with rotation axis of said end effector, said tip pulley and shaft is rigidly rotationally connected to said end effector, said tip pulley and shaft assembly is free to rotate relative to said second arm;

a second belt placed over pulley of said tip pulley and shaft and over said second pulley of said intermediate pulley and shaft, said second belt and said pulleys have means to prevent slippage between themselves;

said pulleys are of such diameters that rotation of said first or second arms does not change the angular orientation between said end effector and mounting surface of said base rotary positioner.

6. The robot of claim 5 further including: a rotator connected to shaft of said base pulley and shaft and mounted to non-rotating portion or mounting surface for said base positioner whereby operation of said rotator causes rotation of said base pulley and shaft and therefore causes rotation of said end effector.

7. A robot for accurate planar movement of an end effector comprising:
 a base rotary means that supports and rotates a base arm to a specified position or speed;
 a second rotary means mounted on the distal end of said base arm, said second rotary means is oriented such that its axis of rotation is parallel to axis of rotation of said base rotary means;
 said second rotary means supports and rotates a second arm relative to said base arm to a specified position or speed;
 said second arm supports an end effector on distal end of said second arm;
 said second arm supports a counterweight such that said second arm and all its attachments are substantially balanced about rotation axis of said second rotary means;
 said base arm supports a counterweight such that said base arm and all its attachments are substantially balanced about rotation axis of said base rotary means.

8. The robot of claim 7 further including a base supporting said base rotary means.

9. The robot of claim 8 further including a tilting means located between said base and said base rotary means.

10. The robot of claim 7 further including a tip rotary means located on distal end of said second arm, said tip rotary mean rotates said end effector to a specified position or speed.

11. The robot of claim 7 further including:
 a base pulley and shaft located concentric with rotation axis of said base rotary means, shaft of said base pulley and shaft is rotationally connected to non-rotation portion of said base rotary means or mounting surface for said base rotary means;
 an intermediate pulley set and shaft has a first pulley and a second pulley, said intermediate pulley set and shaft is located concentric with rotation axis of said second rotary means, said intermediate pulley set and shaft is free to rotate;
 a base belt placed over pulley of said base pulley and shaft and over said first pulley of said intermediate pulley set and shaft, said first belt and said pulleys have means to prevent slippage between themselves;
 a tip pulley and shaft located concentric with rotation axis of said end effector, said tip pulley and shaft is rigidly rotationally connected to said end effector, said tip pulley and shaft assembly is free to rotate relative to said second arm;
 a second belt placed over pulley of said tip pulley and shaft and over said second pulley of said intermediate pulley and shaft, said second belt and said pulleys have means to prevent slippage between themselves;
 said pulleys are of such diameters that rotation of said first or second arms does not change the angular orientation between said end effector and mounting surface for said base rotary means.

12. The robot of claim 11 further including: a rotation means connected to shaft of said base pulley and shaft and mounted to non-rotating portion of said base rotary means or mounting surface for said base positioner whereby operation of said rotator means causes rotation of said base pulley and shaft and therefore causes rotation of said end effector.

* * * * *